US008836659B2

(12) United States Patent
Chen et al.

(10) Patent No.: US 8,836,659 B2
(45) Date of Patent: Sep. 16, 2014

(54) ELECTRONIC APPARATUS WITH TOUCH INPUT SYSTEM

(75) Inventors: Kai-Yi Chen, Taipei (TW); Yi-Chen Sung, Taipei (TW); Yu-Jen Huang, Taipei (TW); Chia-Chen Wang, Taipei (TW); Yen-Lin Lin, Taipei (TW); Hsiu-Hang Lin, Taipei (TW); Hui Lin, Taipei (TW); Chih-Yen Lan, Taipei (TW); Pei-Ching Hu, Taipei (TW); Yung-Yu Huang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 116 days.

(21) Appl. No.: 13/483,034

(22) Filed: May 29, 2012

(65) Prior Publication Data

US 2012/0306788 A1 Dec. 6, 2012

Related U.S. Application Data

(60) Provisional application No. 61/491,324, filed on May 31, 2011.

(51) Int. Cl.
*G06F 3/041* (2006.01)
*G06F 3/0482* (2013.01)
*G06F 3/0488* (2013.01)

(52) U.S. Cl.
CPC .......... *G06F 3/0482* (2013.01); *G06F 3/04886* (2013.01); *G06F 3/04883* (2013.01)
USPC ......................................... 345/173

(58) Field of Classification Search
CPC .......... G06F 3/0416; G06F 3/04883; G06F 3/04886
USPC .................................... 345/173–178
See application file for complete search history.

(56) References Cited

U.S. PATENT DOCUMENTS

| | | | |
|---|---|---|---|
| 7,898,529 B2 * | 3/2011 | Fitzmaurice et al. | 345/173 |
| 2009/0295743 A1 * | 12/2009 | Nakajoh | 345/173 |
| 2010/0073303 A1 * | 3/2010 | Wu et al. | 345/173 |
| 2011/0022991 A1 * | 1/2011 | Hillis et al. | 715/863 |
| 2011/0057953 A1 * | 3/2011 | Horodezky | 345/647 |

* cited by examiner

*Primary Examiner* — Andrew Sasinowski
(74) *Attorney, Agent, or Firm* — Jianq Chyun IP Office

(57) ABSTRACT

An electronic apparatus with a touch input system is provided. When a complete touch signal is detected, a sliding angle and a sliding track of the complete touch signal are calculated. A menu operation interface with arc-shaped arrangement is displayed in a touch display screen when the sliding angle of the complete touch signal exceeds a predetermined angle. And when an incomplete touch signal is detected, a sliding angle and a sliding track of the incomplete touching signal are calculated for displaying a part of the menu operation interface with arc-shaped arrangement in the touch display screen.

7 Claims, 10 Drawing Sheets

ELECTRONIC APPARATUS WITH TOUCH INPUT SYSTEM

CROSS-REFERENCE TO RELATED APPLICATION

This application claims the priority benefit of U.S. provisional application Ser. No. 61/491,324, filed on May 31, 2011. The entirety of the above-mentioned patent application is hereby incorporated by reference herein and made a part of this specification.

BACKGROUND

1. Technical Field

The invention relates to an electronic apparatus. Particularly, the invention relates to an electronic apparatus with a touch input system.

2. Related Art

Along with development of technology, functions of electronic apparatuses become more and more powerful, and people increasingly depend on the electronic apparatuses in daily life. As the electronic apparatuses are gradually developed to be user-friendly and functional, the electronic apparatus having a touch display screen becomes popular in the market.

For example, a touch display screen is configured in a smart phone or a flat panel computer, and a user can perform touch operations on the touch display screen through a stylus or directly by the finger, so as to operate the electronic apparatus. According to different product sizes and different user types, various gestures are designed for the electronic apparatuses having the touch display screens to facilitate the user's operations.

As the types of data stored in the electronic apparatus are more and more diversified, how to provide the user a more convenient operation mode to obtain more information becomes an important goal to be achieved by related practitioners.

SUMMARY

The invention is directed to an electronic apparatus with a touch input system, in which a user interface is activated by an operation gesture performed on a touch display screen.

The invention provides an electronic apparatus with a touch input system, which includes a touch display screen and a touch sensing device. The touch display screen is connected to the electronic apparatus, and information of the electronic apparatus is displayed through the touch display screen. Here, the touch display screen includes a first display screen edge and a second display screen edge. The touch sensing device is connected to the touch display screen, and detects and receives a touch signal. When the touch sensing device detects a complete touch signal, the electronic apparatus calculates a sliding track and a sliding angle of the complete touch signal, and displays a menu operation interface with arc-shaped arrangement in the touch display screen when the sliding angle of the sliding track exceeds a predetermined angle. Here, the menu operation interface with arc-shaped arrangement includes a plurality of sector functional options. When the touch sensing device detects an incomplete touch signal, the electronic apparatus calculates the sliding track and the sliding angle, and displays a part of the menu operation interface with arc-shaped arrangement in the touch display screen.

In an embodiment of the invention, when the sliding angle of the sliding track does not exceed the predetermined angle, the electronic apparatus calculates the sliding track and the sliding angle, and displays a part of the menu operation interface with arc-shaped arrangement in the touch display screen. Moreover when the touch sensing device detects that the touch signal is terminated, the electronic apparatus executes the sector shaped functional option finally displayed by the part of the menu operation interface with arc-shaped arrangement when the touch signal is terminated and a corresponding function instruction thereof, and closes the part of the menu operation interface with arc-shaped arrangement.

In an embodiment of the invention, the complete touch signal refers to that the touch sensing device continually detects the touch signal, the touch signal slides from the first display screen edge to the second display screen edge and the touch signal is terminated.

In an embodiment of the invention, the incomplete touch signal refers to that the touch sensing device continually detects the touch signal, the touch signal slides from the first display screen edge to the second display screen edge and the touch sensing device does not detect that the touch signal is terminated.

In an embodiment of the invention, the predetermined angle is 45 degrees.

In an embodiment of the invention, the touch sensing device presets a valid region and an invalid region used for detecting the touch signal in the touch display screen. The touch signal slides clockwise or slides anticlockwise.

In an embodiment of the invention, when the touch sensing device detects another touch signal input from an opposite direction and detects that the touch signal is terminated, the menu operation interface with arc-shaped arrangement is closed.

In an embodiment of the invention, as the menu operation interface with arc-shaped arrangement is activated, when the touch sensing device detects a signal of another touch form outside the menu operation interface with arc-shaped arrangement, the menu operation interface with arc-shaped arrangement is closed.

In an embodiment of the invention, as the menu operation interface with arc-shaped arrangement is activated, when the touch sensing device detects a signal of another touch form in the invalid region, the menu operation interface with arc-shaped arrangement is closed.

According to the descriptions, as the touch operation of the touch display screen is performed, when it is detected that the touch signal slides from the first display screen edge to the second display screen edge, and the sliding angle exceeds the predetermined angle, the menu operation interface with arc-shaped arrangement is displayed in the touch display screen. In this way, a more intuitive operation method is provided to the user.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
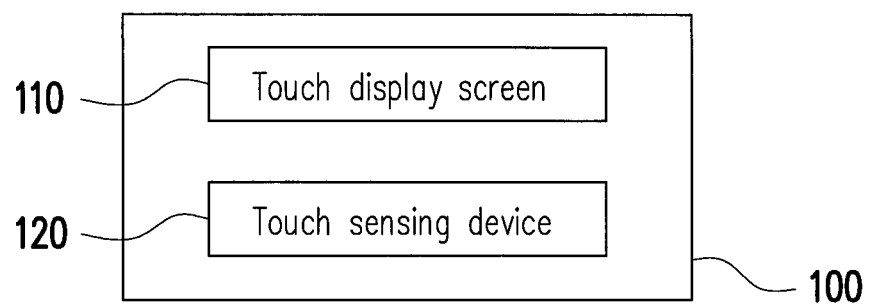
FIG. 1 is a block diagram of an electronic apparatus with a touch input system according to an embodiment of the invention.

FIG. 1 is a block diagram of an electronic apparatus with a touch input system according to an embodiment of the invention. Referring to FIG. 1, the electronic apparatus 100 includes a touch display screen 110 and a touch sensing device 120.

The touch display screen 110 is configured to display information of the electronic apparatus 100. Here, the touch display screen 110 has a first display screen edge and a second display screen edge. For example, the touch display screen 110 has four edges, where two adjacent edges thereof serve as the first display screen edge and the second display screen edge.

The touch sensing device 120 is connected to the touch display screen 110 for detecting and receiving a touch signal from the touch display screen 110. Moreover, the touch sensing device 120 presets a valid region and an invalid region used for detecting the touch signal in the touch display screen 110. For example, the electronic apparatus 100 calculates a sliding track and a sliding angle of the touch signal generated in the valid region to determine whether or not to activate a menu operation interface, while the touch signal generated in the invalid region cannot activate the menu operation interface.

When the touch sensing device 120 detects a complete touch signal, the electronic apparatus 100 calculates a sliding track and a sliding angle of the complete touch signal. For example, the complete touch signal refers to that the touch sensing device continually detects a touch signal sliding from the first display screen edge to the second display screen edge and the touch signal is terminated. In case that the user's finger presses the touch display screen 110, the complete touch signal is, for example, a touch signal generated from when the finger presses the touch display screen 110 until the finger releases the touch display screen 110. When the calculated sliding angle of the sliding track of the complete touch signal exceeds a predetermined angle, the electronic apparatus 100 displays a menu operation interface with arc-shaped arrangement in the touch display screen 110. Here, the menu operation interface with arc-shaped arrangement includes a plurality of sector functional options.

On the other hand, when the touch sensing device 120 detects an incomplete touch signal, the electronic apparatus 100 calculates a sliding track and a sliding angle of the incomplete touch signal, and displays a part of the menu operation interface with arc-shaped arrangement in the touch display screen 110. For example, the incomplete touch signal refers to that the touch sensing device 120 continually detects a touch signal and the touch signal is not terminated, i.e. the touch signal generated before the touch sensing device 120 detects that the touch signal is terminated is regarded as the incomplete touch signal. In case that the user's finger presses the touch display screen 110, the incomplete touch signal is, for example, a touch signal generated when the finger keeps pressing the touch display screen 110.

Figure 2A:
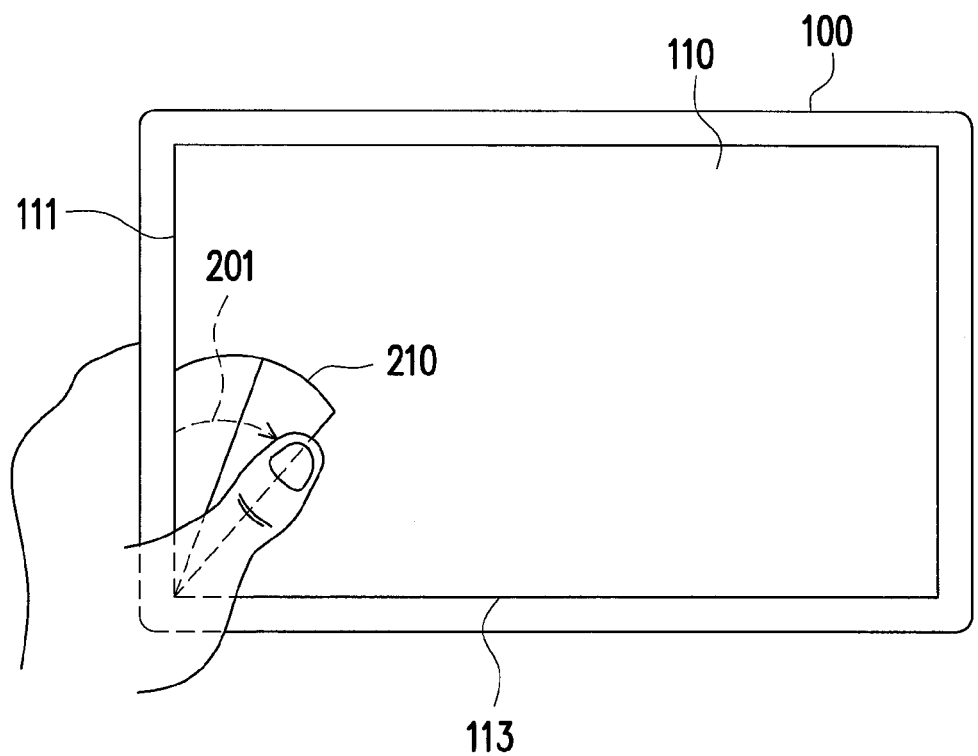
FIG. 2A and FIG. 2B are schematic diagrams of operation gestures according to an embodiment of the invention.
Figure 2B:
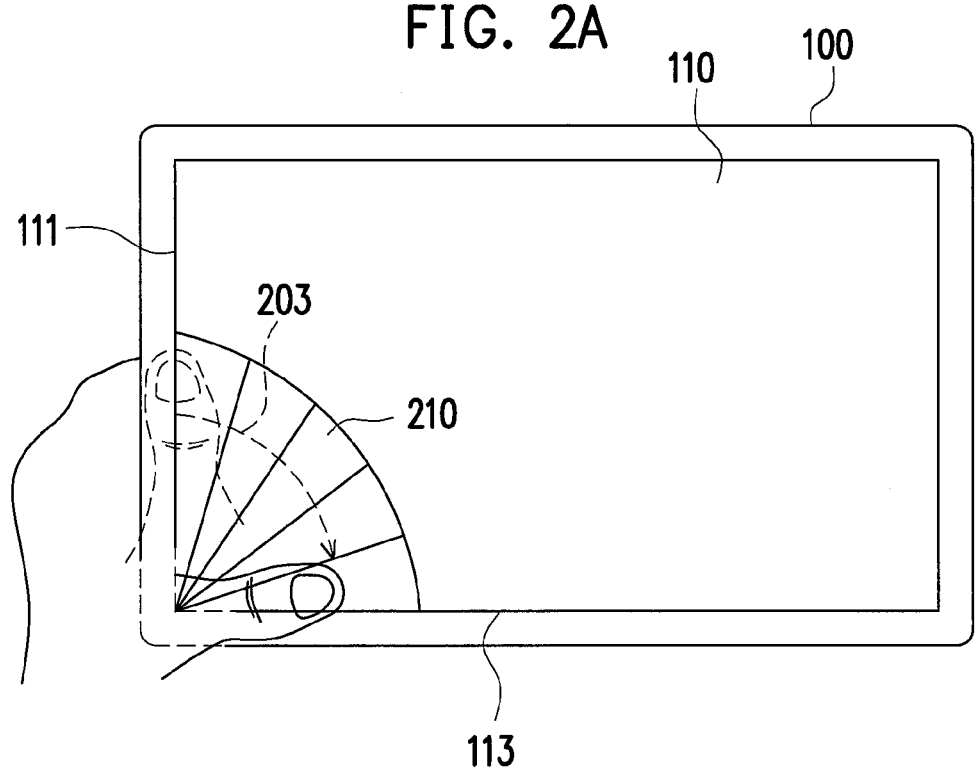

For example, FIG. 2A and FIG. 2B are schematic diagrams of operation gestures according to an embodiment of the invention. Referring to FIG. 1, FIG. 2A and FIG. 2B, the electronic apparatus 100 is, for example, a flat panel computer or a smart phone. The touch display screen 110 includes a first display screen edge 111 and a second display screen edge 113. In the present embodiment, it is assumed that the user holds the electronic apparatus 100 by a single hand, and uses a thumb to perform the touch operation on the touch display screen 110. Here, the touch signal slides clockwise. In other embodiments, the touch signal may slide anticlockwise.

In FIG. 2A, the user slides the finger from the first display screen edge 111 towards the second display screen edge 113, and the electronic apparatus 100 detects an arc-shaped sliding track 201. As the sliding track 201 slides, a part of a menu operation interface 210 is spread from the first display screen edge 111 towards the second display screen edge 113.

Moreover, in FIG. 2B, the electronic apparatus 100 detects that a sliding track 203 slides from the first display screen edge 111 to the second display screen edge 113, as the sliding track 203 slides, the menu operation interface 210 is spread from the first display screen edge 111 towards the second display screen edge 113.

When the touch sensing device 120 detects that touch signal generated by the touch display screen 110 slides from the first display screen edge 111 towards the second display screen edge 113, a sliding angle of the touch signal can be calculated through a processing unit. Moreover, by determining whether the sliding angle exceeds a predetermined angle, the processing unit may determine whether or not to activate or close the menu operation interface with arc-shaped arrangement when the touch signal is terminated.

For example, before the touch signal is terminated, a spreading area of a part of the menu operation interface with arc-shaped arrangement is determined according to the sliding angle of the touch signal (i.e. the incomplete touch signal). When the touch signal is terminated, if the sliding angle of the touch signal (i.e. the complete touch signal) exceeds the predetermined angle, the menu operation interface with arc-shaped arrangement is displayed, and if the sliding angle does not exceed the predetermined angle, the part of the spread menu operation interface with arc-shaped arrangement is closed.

Figure 3A:
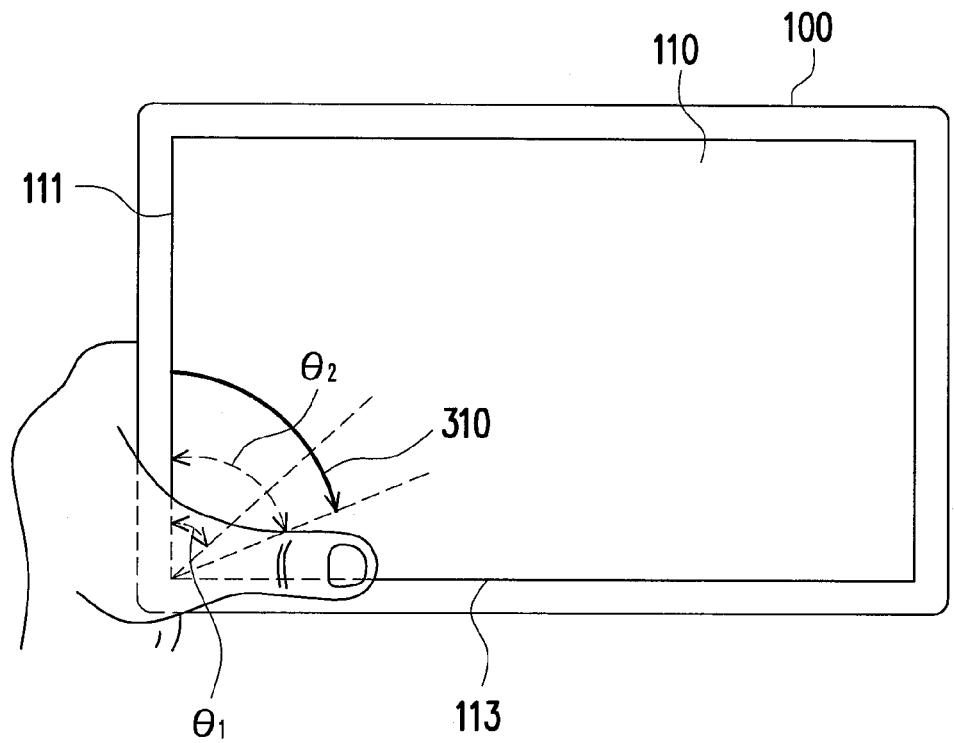
FIG. 3A and FIG. 3B are schematic diagrams of touch operations according to an embodiment of the invention.
Figure 3B:
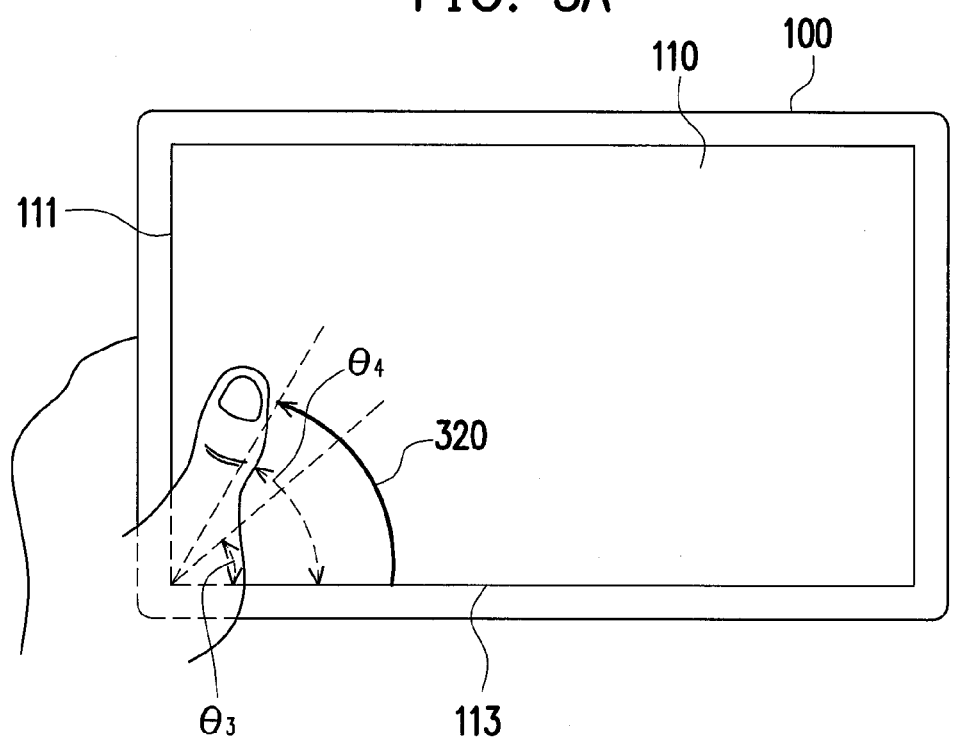

Another embodiment is provided below to describe the comparison between the sliding angle and the predetermined angle. FIG. 3A and FIG. 3B are schematic diagrams of touch operations according to an embodiment of the invention. In the present embodiment, the touch display screen 110 of FIG. 1 is taken as an example, and the user performs the touch operations as that shown in FIG. 3A or FIG. 3B in the touch display screen 110. A sliding track 310 of FIG. 3A slides from the first display screen edge 111 towards the second display screen edge 113, and a sliding track 320 of FIG. 3B slides from the second display screen edge 113 towards the first display screen edge 111.

In FIG. 3A, it is assumed that a predetermined angle $\theta_1$ is 45 degrees, though the invention is not limited thereto. When it is detected that a sliding angle $\theta_2$ of the sliding track 310 exceeds the predetermined angle $\theta_1$, it is determined that the user intends to activate the menu operation interface with arc-shaped arrangement. If now the user releases the finger, the menu operation interface with arc-shaped arrangement is displayed in the touch display screen 110.

Moreover, in FIG. 3B, it is assumed that a predetermined angle $\theta_3$ is 45 degrees, though the invention is not limited thereto. When it is detected that a sliding angle $\theta_4$ of the sliding track 320 exceeds the predetermined angle $\theta_3$, it is determined that the user intends to activate the menu operation interface with arc-shaped arrangement. If now the user releases the finger, the menu operation interface with arc-shaped arrangement is displayed in the touch display screen 110.

Moreover, in other embodiments, an acceleration of the touch signal can be used to determine whether the user intends to activate the menu operation interface with arc-shaped arrangement. For example, in FIG. 3A, if the touch signal slides from the first display screen edge 111 towards the second display screen edge 113, and the acceleration of the touch signal is greater than a predetermined acceleration, it is determined that the user intends to activate the menu operation interface with arc-shaped arrangement. In this way, after the finger is released after quick sliding, the menu operation interface with arc-shaped arrangement is also displayed in the touch display screen 110.

Figure 4:
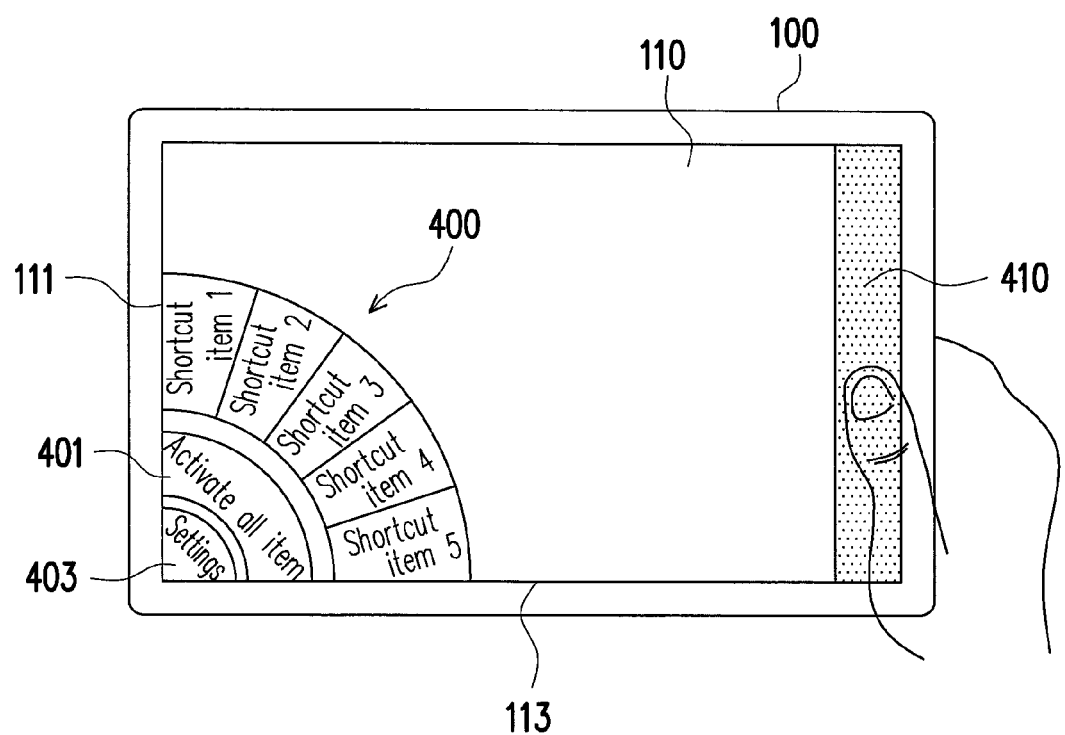
FIG. 4 is a schematic diagram of a menu operation interface with arc-shaped arrangement according to an embodiment of the invention.

When it is determined that the user intends to activate a ring-shape interface, and now the user releases the finger, the electronic apparatus 100 displays the menu operation interface with arc-shaped arrangement in the touch display screen 110. For example, FIG. 4 is a schematic diagram of a menu operation interface with arc-shaped arrangement according to an embodiment of the invention. In the present embodiment, the touch display screen 110 of FIG. 1 is taken as an example for descriptions.

Referring to FIG. 4, the menu operation interface with arc-shaped arrangement 400 includes shortcut items 1-5, which are respectively shortcuts of different application programs. Moreover, the menu operation interface with arc-shaped arrangement 400 further includes functional options 401 and 403. For example, the functional option 401 is used to activate all of the items (including the shortcut items 1-5). The functional option 403 is used to activate an edit interface for the user to determine the items to be displayed in the menu operation interface with arc-shaped arrangement 400. Moreover, in other embodiments, the items of the menu operation interface with arc-shaped arrangement 400 can also be shortcuts of tool items, and the shortcuts to be displayed in the menu operation interface with arc-shaped arrangement 400 can be determined according to user's usage status.

For example, when the complete touch signal as that shown in FIG. 3A or FIG. 3B is produced in the touch display screen 110, the menu operation interface with arc-shaped arrangement 400 is displayed in the touch display screen 110. Regarding the touch operations of FIG. 3A and FIG. 3B, regardless of the clockwise sliding or the anticlockwise sliding, the menu operation interface with arc-shaped arrangement 400 can all be displayed in the touch display screen 110. Here, the clockwise sliding or the anticlockwise sliding is only used as an example, and the invention is not limited thereto. Moreover, a position of the menu operation interface with arc-shaped arrangement 400 in the touch display screen 110 can be determined according to a position of the touch signal. For example, the user performs a touch operation at a lower left corner of the touch display screen 110 (shown in FIG. 3A or FIG. 3B), the menu operation interface with arc-shaped arrangement 400 is then displayed at the lower left corner of the touch display screen 110.

Moreover, in the present embodiment, a holding region 410 (i.e. the invalid region) can be set at a right edge of the touch display screen 110 to facilitate the user holding the electronic apparatus 100. Namely, the touch sensing device 120 does not take a pure touch signal (which is not dragged or does not slide) in the holding region 410 as a complete touch signal. However, in other embodiments, the holding region 410 can be set according to a display area of the menu operation interface with arc-shaped arrangement 400. For example, when the menu operation interface with arc-shaped arrangement 400 is displayed at the lower right corner of the touch display screen 110, the holding region 410 is then set at the left edge of the touch display screen 110.

It should be noticed that when the menu operation interface with arc-shaped arrangement 400 is activated, the menu operation interface with arc-shaped arrangement 400 can be gradually spread from one edge towards another edge. Namely, the menu operation interface with arc-shaped arrangement 400 is gradually spread as the finger drags. Moreover, the sliding angle of the touch signal is continually detected, and an area of the spread menu operation interface with arc-shaped arrangement 400 is determined according to the direction of the sliding track and a magnitude of the sliding angle.

In addition, if the touch signal is terminated before the sliding angle reaches the predetermined angle, the menu operation interface with arc-shaped arrangement 400 is closed. For example, the sliding angle of the sliding track does not reach the predetermined angle when the finger leaves the touch display screen 110, the spread menu operation interface with arc-shaped arrangement 400 is closed. On the other hand, if the sliding angle reaches the predetermined angle, it is determined that the touch operation is ended, and the menu operation interface with arc-shaped arrangement 400 is activated in a corner region. Moreover, a following situation can be further set: if it is determined that the sliding angle of the touch operation reaches the predetermined angle, regardless of where the gesture of the touch operation slides to or drags to thereafter, after the finger leaves the touch display screen 110, the menu operation interface with arc-shaped arrangement 400 is also activated in the corner region.

During a process of spreading the menu operation interface with arc-shaped arrangement 400, the menu operation interface with arc-shaped arrangement 400 can be spread or withdrawn along with the touch operation. For example, in FIG. 3A, when the finger moves towards the second display screen edge 113, the menu operation interface with arc-shaped arrangement 400 is gradually spread along with a magnitude of the sliding angle $\theta_2$, and when the finger moves back towards the first display screen edge 111, the spread menu operation interface with arc-shaped arrangement 400 is gradually withdrawn from the second display screen edge 113 towards the first display screen edge 111. The embodiment of FIG. 3B can be deduced by analogy.

Other embodiments are provided below to describe methods for closing the menu operation interface with arc-shaped arrangement 400. FIGS. 5A-5D are schematic diagrams illustrating methods for closing a menu operation interface with arc-shaped arrangement according to embodiments of the invention, where the embodiments of FIG. 3A and FIG. 3B are taken as examples for describing the embodiments of FIG. 5A and FIG. 5B.

Figure 5A:
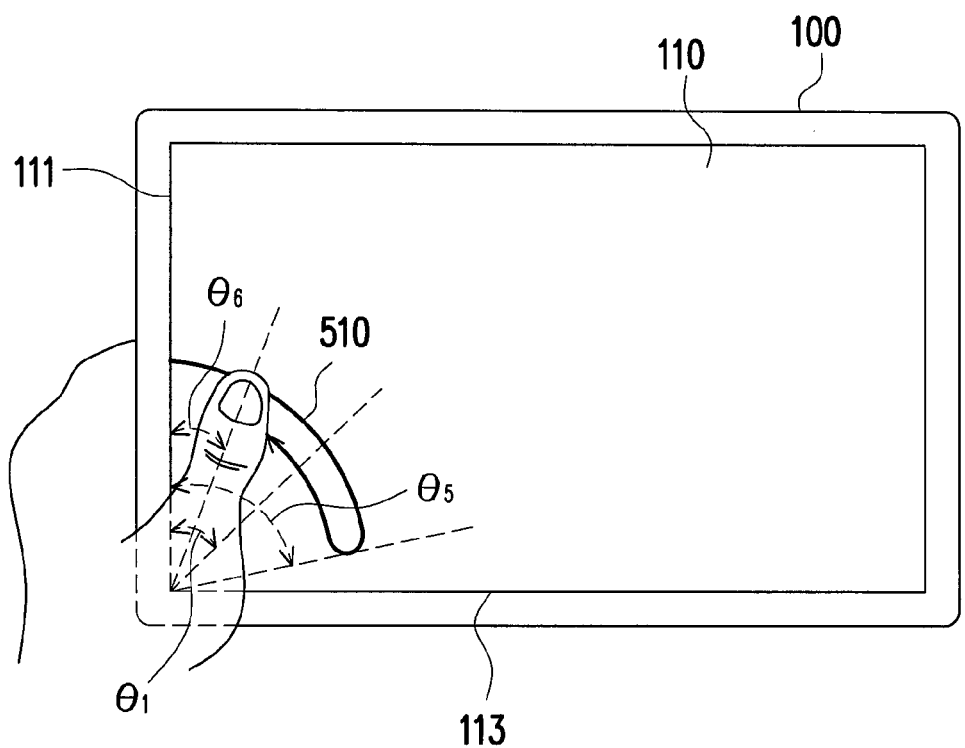
FIGS. 5A-5D are schematic diagrams illustrating methods for closing a menu operation interface with arc-shaped arrangement according to embodiments of the invention.

In FIG. 5A, the user's finger slides from the first display screen edge 111 towards the second display screen edge 113, so as to gradually spread the menu operation interface with arc-shaped arrangement 400, and after the sliding angle $\theta_5$ of the touch signal exceeds the predetermined angle $\theta_1$, the user's finger moves back towards the first display screen edge 111 (shown as a sliding track 510 of FIG. 5A), so as to gradually withdraw the menu operation interface with arc-shaped arrangement 400 from the second display screen edge 113 towards the first display screen edge 111, until the menu operation interface with arc-shaped arrangement 400 is closed. Moreover, it can be further set as that when the touch signal is terminated (the touch operation is ended), it is detected whether a sliding angle $\theta_6$ from a start position of the sliding track 510 to an end position of the sliding track 510 exceeds the predetermined angle $\theta_1$. Here, since the sliding angle $\theta_6$ does not exceed the predetermined angle $\theta_1$, it is determined to close the menu operation interface with arc-shaped arrangement 400 after the touch signal is terminated (the finger leaves the touch display screen 110). Moreover, if the sliding angle $\theta_6$ still exceeds the predetermined angle $\theta_1$, it is determined to activate the menu operation interface with arc-shaped arrangement 400 after the touch signal is terminated.

Figure 5B:
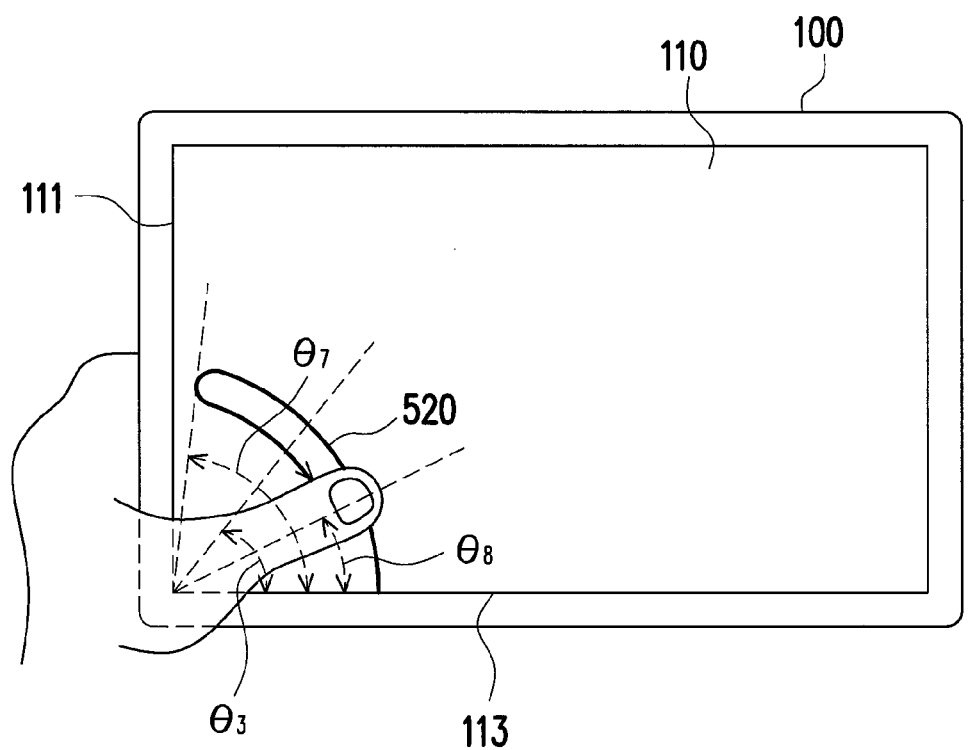

On the other hand, the embodiment of FIG. 5B is similar to the embodiment of FIG. 5A. In FIG. 5B, after the sliding angle $\theta_7$ of the touch signal exceeds the predetermined angle $\theta_3$, the user's finger moves back towards the second display screen edge 113 (shown as a sliding track 520 of FIG. 5B). In FIG. 5B, when the touch signal is terminated, since a sliding angle $\theta_8$ from a start position of the sliding track 520 to an end position of the sliding track 520 does not exceed the predetermined angle $\theta_3$, the menu operation interface with arc-shaped arrangement 400 is closed.

Figure 5C:
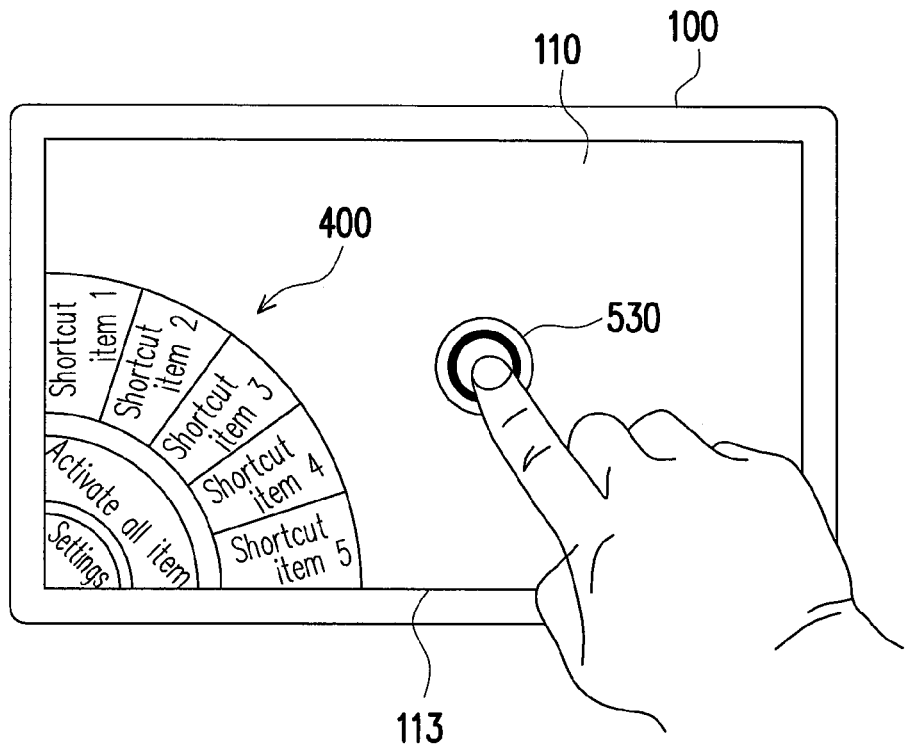

Then, referring to FIG. 5C, after the menu operation interface with arc-shaped arrangement 400 is activated, when the user touches a place in the touch display screen 110 outside the menu operation interface with arc-shaped arrangement 400, for example, a touch position 530, the menu operation interface with arc-shaped arrangement 400 is closed.

Figure 5D:
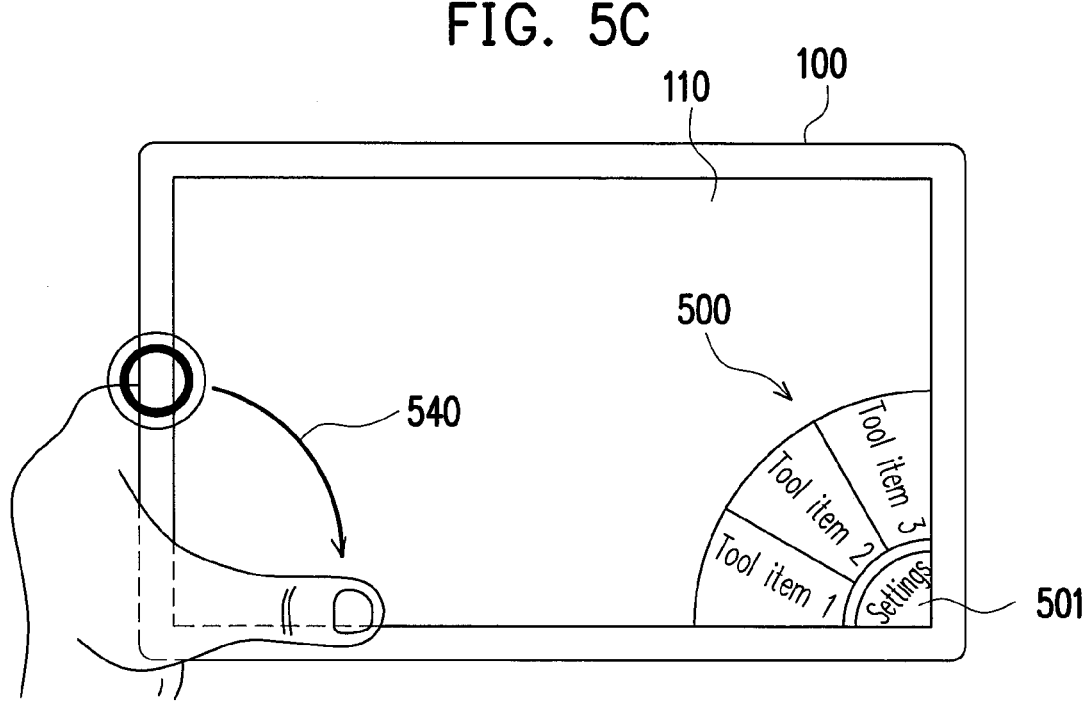

Moreover, it is assumed that different menu operation interfaces with arc-shaped arrangement can be activated at the lower left corner and the lower right corner of the touch display screen 110. In FIG. 5D, it is assumed that a menu operation interface with arc-shaped arrangement 500 has been activated at the lower right corner of the touch display screen 110, and items included in the menu operation interface with arc-shaped arrangement 500 are, for example, tool items 1-3 and a functional option 501, where the functional item 501 is, for example, an edit interface used to activate tool rows, which provides the user to determine the items to be displayed in the menu operation interface with arc-shaped arrangement 500. A method for activating the menu operation interface with arc-shaped arrangement 500 is similar to the method for activating the menu operation interface with arc-shaped arrangement 400, which is not repeated.

In FIG. 5D, the menu operation interface with arc-shaped arrangement 500 has been activated at the lower right corner of the touch display screen 110, and if a sliding track 540 generated by another touch signal is detected at the lower left corner, the menu operation interface with arc-shaped arrangement 500 is closed, and the menu operation interface with arc-shaped arrangement 400 is activated, as that shown in FIG. 4. Namely, after one of the corner regions receives the touch signal to active one of the menu operation interfaces with arc-shaped arrangement, when the other corner region receives another touch signal to active the other one of the menu operation interfaces with arc-shaped arrangement, the previously activated menu operation interface with arc-shaped arrangement is closed.

After the whole menu operation interface with arc-shaped arrangement is activated, one of the items displayed in the menu operation interface with arc-shaped arrangement can be selected according to the user's choice, so as to directly activate the selected item. Taking the embodiment of FIG. 4 as an example, the user can directly select one of the shortcut items 1-5, or select the functional option 501 or 503. For example, when one of the shortcut items 1-5 is selected, a corresponding application program is activated in the touch display screen 110. Here, if the selected item has a sub menu, it can be further set to spread the sub menu of the selected item in the touch display screen 110. For example, another interface is directly activated to display the sub menu, or the sub menu is displayed outwards in a concentric circle manner at an outer layer of the menu operation interface with arc-shaped arrangement.

Figure 6:
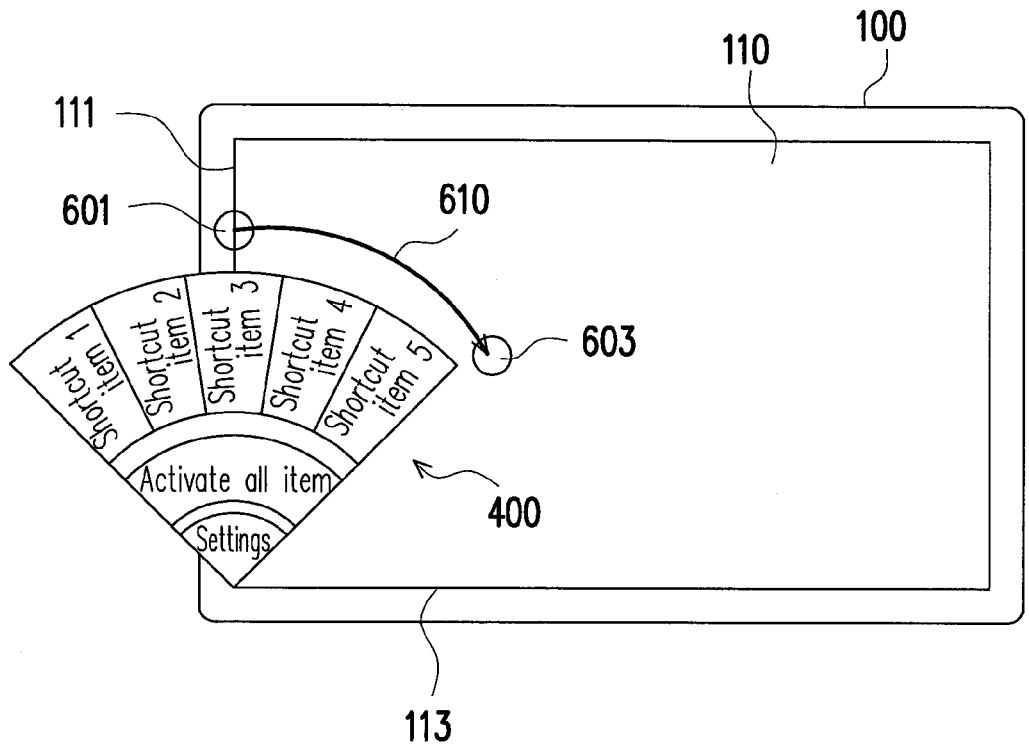
FIG. 6 is a schematic diagram of selecting an item from a menu operation interface with arc-shaped arrangement according to an embodiment of the invention.

Moreover, in another embodiment, a flow of activating the item in the menu operation interface with arc-shaped arrangement is described below. When the touch signal is terminated, the item at a predetermined position in the spread menu operation interface with arc-shaped arrangement 400 is detected, and when the finger leaves the touch display screen 110, an application program corresponding to the item at the predetermined position is activated. For example, FIG. 6 is a schematic diagram of selecting an item from a menu operation interface with arc-shaped arrangement according to an embodiment of the invention. Referring to FIG. 6, the touch signal slides from the first display screen edge 111 towards the second display screen edge 113 (shown as a sliding track 610 of FIG. 6). Here, it is assumed that the predetermined position is set at the first display screen edge 111. When the user's finger drags from a touch position 601 to a touch position 603 and leaves the touch display screen 110, the shortcut item 3 is located at the predetermined position. Therefore, after the finger leaves the touch display screen 110, the application program corresponding to the shortcut item 3 can be activated in the touch display screen 110. The above embodiment is only an example, and the invention is not limited thereto, and the predetermined position can also be set at any edge, or at any position in the touch display screen 110.

Figure 7:
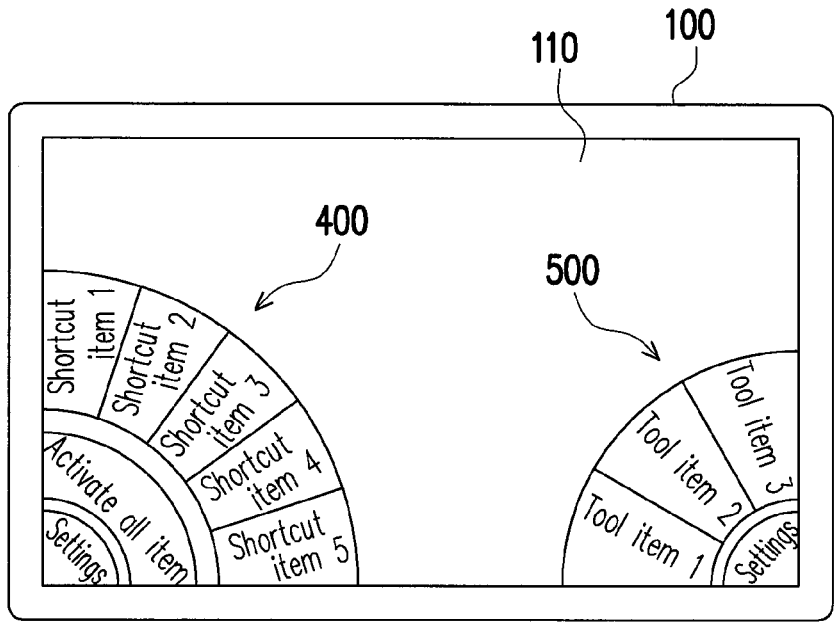
FIG. 7 is a schematic diagram of menu operation interfaces with arc-shaped arrangement according to an embodiment of the invention.
Figure 8A:
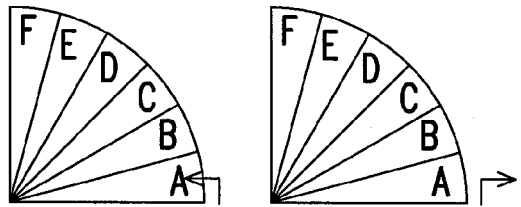
FIGS. 8A-8F are schematic diagrams of gesture detections according to an embodiment of the invention.
Figure 8B:
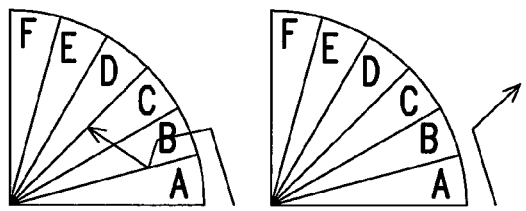
Figure 8C:
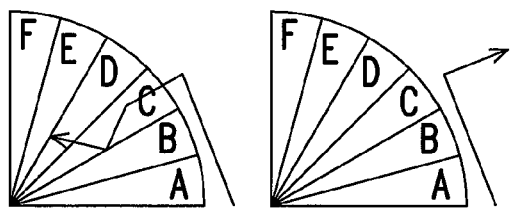
Figure 8D:
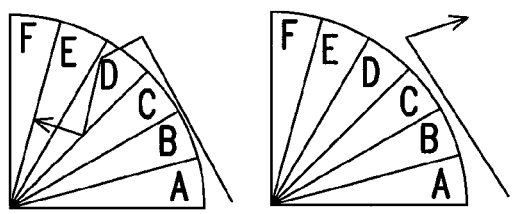
Figure 8E:
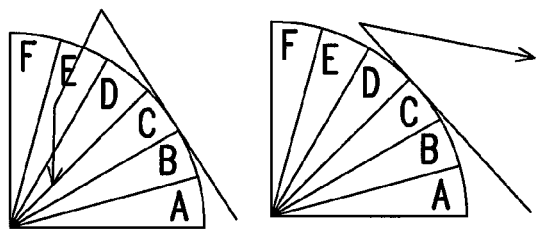
Figure 8F:
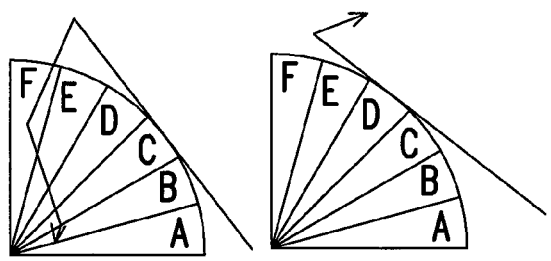

It can be determined to activate one menu operation interface with arc-shaped arrangement in the touch display screen 110 or activate two menu operation interfaces with arc-shaped arrangement according to a size of the touch display screen 110. For example, when the electronic apparatus 100 is upright, only one menu operation interface with arc-shaped arrangement can be activated in the touch display screen 110, and when the electronic apparatus 100 is laid down, two menu operation interfaces with arc-shaped arrangement can be respectively activated at two opposite corner regions in the touch display screen 110, as that shown in FIG. 7. FIG. 7 is a schematic diagram of menu operation interfaces with arc-shaped arrangement according to an embodiment of the invention. In the present embodiment, the two opposite corner regions of the touch display screen 110 respectively receive a touch operation, so as to simultaneously activate the menu operation interface with arc-shaped arrangement 400 and the menu operation interface with arc-shaped arrangement 500 at the corner regions of the lower left corner and the lower right corner. For example, the menu operation interface with arc-shaped arrangement 400 can be first activated, and then the menu operation interface with arc-shaped arrangement 500 is activated. Alternatively, the menu operation interface with arc-shaped arrangement 500 is first activated, and then the menu operation interface with arc-shaped arrangement 400 is activated, or the menu operation interface with arc-shaped arrangement 400 and the menu operation interface with arc-shaped arrangement 500 are simultaneously activated.

Another embodiment is provided below to describe a method for detecting a valid gesture, though it is only used as an example, and the invention is not limited thereto.

FIGS. 8A-8F are schematic diagrams of gesture detections according to an embodiment of the invention. In the present embodiment, the lower left region of the touch display screen 110 is taken as an example for descriptions. A corner region is set at the lower left region of the touch display screen 110, and is divided into six equal portions, i.e. each portion has 15 degrees. Arrows in FIGS. 8A-8F represents sliding tracks of the user in the touch display screen 110. Moreover, in the present embodiment, it is assumed that a sliding direction of the sliding track is anticlockwise, i.e. slides from the second display screen edge 113 towards the first display screen edge 111 in the touch display screen 110 of FIG. 1. The electronic apparatus 100 calculates the sliding angles to the top and left, so as to learn a moving direction of the sliding track.

Here, if the sliding track that originally slides straight or circularly to the upper left of the touch display screen 110 by a half suddenly slides towards other directions, the later part can be regarded as an invalid gesture. When the invalid gesture is detected, if the sliding angle generated before the invalid gesture is below 45 degrees (assuming the predetermined angle is 45 degrees), as that shown by the touch operations of FIG. 8A, FIG. 8B and FIG. 8C, these touch operations are determined to be invalid. If the sliding angle generated before the invalid gesture has exceeded 45 degrees, as that shown by the touch operations of FIG. 8D, FIG. 8E and FIG. 8F, these touch operations are still determined to be valid. Namely, the invalid gesture is regarded as that the finger is released, and the menu operation interface with arc-shaped arrangement 400 (shown in FIG. 4) is spread in the touch display screen 110. This is because that in FIGS. 8D-8F, since the touch operation has slid over 45 degrees, the electronic apparatus 100 determines that the user intends to spread the menu operation interface with arc-shaped arrangement 400.

Figure 9:
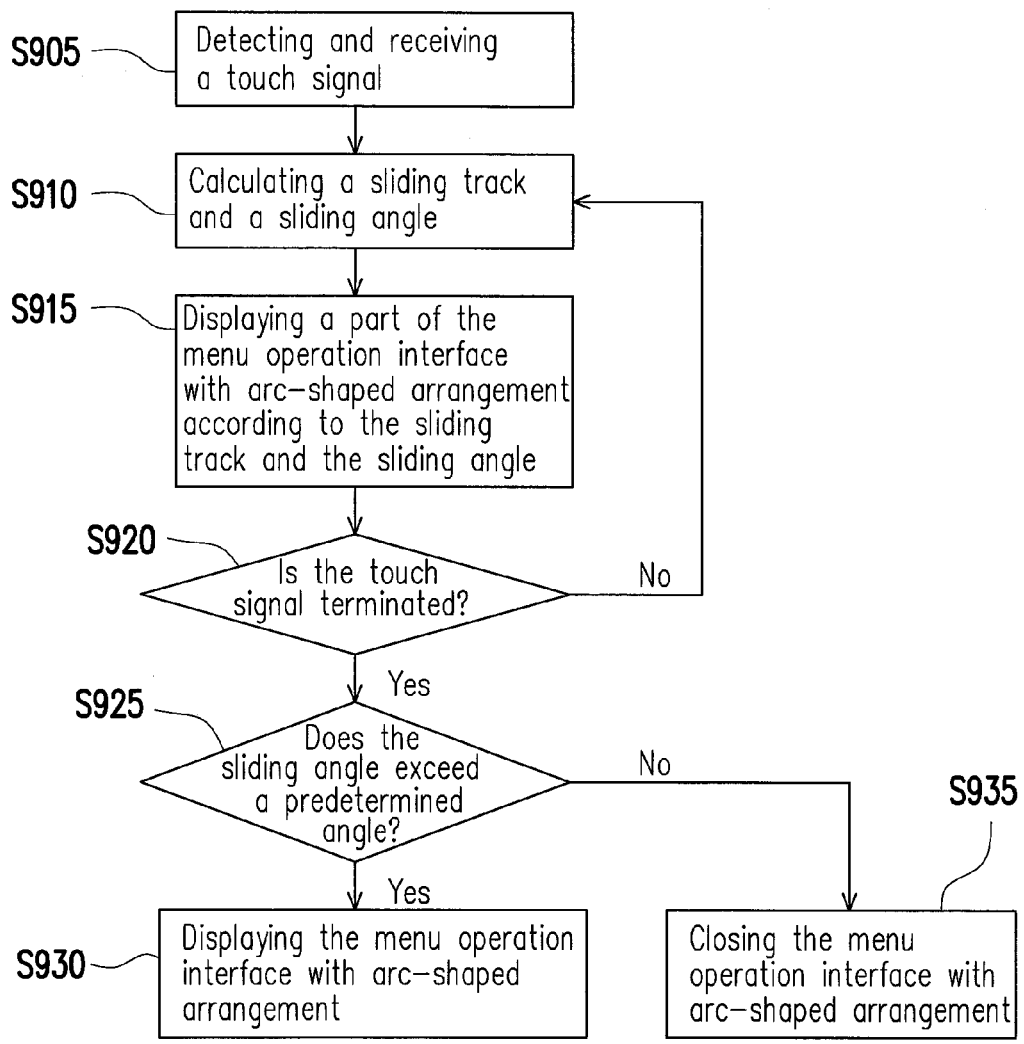
FIG. 9 is a flowchart illustrating a method for operating a touch display screen according to an embodiment of the invention.

Moreover, another embodiment is provided below to describe a method for operating the touch display screen 110. FIG. 9 is a flowchart illustrating a method for operating a touch display screen according to an embodiment of the invention. Referring to FIG. 1 to FIG. 9, in step S905, the touch sensing device 120 detects and receives a touch signal. Then, in step S910, the electronic apparatus 100 calculates a sliding track and a sliding angle. Then, in step S915, a part of menu operation interface with arc-shaped arrangement is displayed according to the sliding track and the sliding angle. Namely, a part of the menu operation interface is spread along with the sliding track and the sliding angle, as that shown in FIG. 2A and FIG. 2B.

Then, in step S920, it is determined whether the touch signal is terminated. Regarding a finger touch, it is determined whether the finger leaves the touch display screen 110. When it is detected that the touch signal is still not terminated, steps S910-S915 are repeated, by which an area size of the part of the menu operation interface with arc-shaped arrangement to be spread is determined according to the sliding track and the sliding angle.

When it is determined that the touch signal is terminated, in step S925, it is determined whether the sliding angle corresponding to the touch signal termination exceeds a predetermined angle, where the determination method thereof has been described above with reference of FIG. 3A and FIG. 3B. If the sliding angle exceeds the predetermined angle, a step S930 is executed, by which the menu operation interface with arc-shaped arrangement is displayed in the touch display screen 110, as that shown in FIG. 4. If the sliding angle does not exceed the predetermined angle, a step S935 is executed, by which the menu operation interface with arc-shaped arrangement is closed.

After the menu operation interface with arc-shaped arrangement is displayed in the touch display screen 110, when the touch sensing device 120 detects another touch signal input from an opposite direction and detects that the touch signal is terminated, the menu operation interface with arc-shaped arrangement is closed. For example, taking FIG. 2B as an example, shown as the sliding track 203, the finger slides from the first display screen edge 111 towards the second display screen edge 113. If the touch sensing device 120 detects a touch signal sliding from the second display screen edge 113 towards the first display screen edge 111, and such touch signal is terminated, the displayed menu operation interface with arc-shaped arrangement 210 is closed.

Moreover, when the touch sensing device 120 detects a signal of another touch form outside the menu operation interface with arc-shaped arrangement (shown as FIG. 5C or FIG. 5D), the menu operation interface with arc-shaped arrangement is closed. The signal of the other touch form is, for example, a gentle touch signal or any touch signal in the touch display screen 110 outside the menu operation interface with arc-shaped arrangement. Further, when the touch sensing device 120 detects that the signal of the other form is in an invalid region, the menu operation interface with arc-shaped arrangement is closed.

Figure 10:
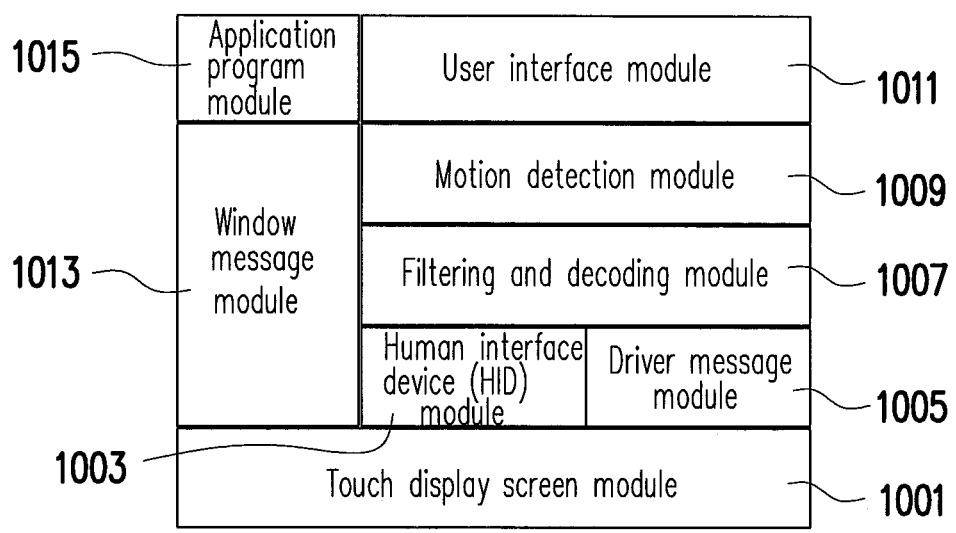
FIG. 10 is a schematic diagram of a structure of operation modules according to an embodiment of the invention.

FIG. 10 is a schematic diagram of a structure of operation modules according to an embodiment of the invention. Referring to FIG. 10, the structure of the operation modules includes a touch display screen module 1001, a human interface device (HID) module 1003, a driver message module 1005, a filtering and decoding module 1007, a motion detection module 1009, a user interface module 1011, a window message module 1013 and an application program module 1015.

Here, the touch display screen module 1001 is configured to detect a touch message on the touch display screen 110. The driver message module 1005 is configured to obtain the touch message of the touch operation from the touch display screen module 1001 through a driver level, and the driver message module 1005 blocks a message of an operating system, so that the touch message of the touch operation is not transmitted to the operating system. The filtering and decoding module 1007 is configured to transform the touch message into a format suitable for the operating system, and then transmit it to the HID module 1003. For example, when the finger touches the touch display screen 110, the touch display screen 110 generates an analog signal. Then, the filtering and decoding module 1007 transforms the analog signal into a digital signal that can be accepted by the operating system, and after compiling, the touch message is transmitted to the HID module 1003.

The HID module 1003 is configured to receive a touch signal from the touch display screen module 1001 through a HID protocol, and determines whether a start position of the touch signal falls within the valid region of the touch display screen 110. If the start position of the touch signal falls within the valid region, the HID module 1003 continually receives a next touch signal, and keeps collecting the touch signals until the number of the collected touch signals is greater than a predetermined number, and then the HID module 1003 starts to calculate a sliding direction of the touch signals. Moreover, the HID module 1003 further determines whether a sliding angle of the touch signal is greater than a predetermined angle, and transmits a touchmove event to the motion detection module 1009 when the sliding angle is greater than the predetermined angle.

After the motion detection module 1009 receives the touchmove event, the motion detection module 1009 determines whether the touch signal is valid (for example, determination of the valid gesture of FIG. 8), and transmits a notification event to the user interface module 1011. The user interface module 1011 is configured to determine whether or not to display a menu operation interface with arc-shaped arrangement according to the notification event transmitted by the motion detection module 1009.

Moreover, the window message module 1013 is configured to receive the touch signal under the operating system, and provides the touch signal to the application program module 1015. The application program module 1015 is configured to activate a corresponding application program according to the received touch signal.

However, in other embodiments, independent hardware chips can be used to implement the aforementioned operating modules, which is only described as an example, and the invention is not limited thereto.

In summary, in the aforementioned embodiments, the touch operation is performed in the touch display screen, and when the touch signal slides towards the predetermined direction, the menu operation interface with arc-shaped arrangement is displayed. Moreover, for the sake of precision, only when the sliding angle of the sliding track of the touch signal exceeds the predetermined angle, it is determined that the user intends to spread the menu operation interface with arc-shaped arrangement. In this way, a more intuitive operation method is provided to the user, which facilitates the user to quickly activate the menu operation interface with arc-shaped arrangement while holding the electronic apparatus.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic apparatus with a touch input system, comprising:
    a touch display screen, displaying information of the electronic apparatus, and having a first display screen edge and a second display screen edge; and
    a touch sensing device, connected to the touch display screen, and detecting and receiving a touch signal,
    wherein when the touch sensing device detects a complete touch signal, the electronic apparatus calculates a sliding track and a sliding angle of the complete touch signal, and displays a menu operation interface with arc-shaped arrangement in the touch display screen when the sliding angle of the sliding track exceeds a predetermined angle, wherein the menu operation interface with arc-shaped arrangement comprises a plurality of sector functional options, wherein the complete touch signal refers to that the touch sensing device continually detects the touch signal, the touch signal slides from the first display screen edge to the second display screen edge and the touch signal is terminated, and
    when the touch sensing device detects an incomplete touch signal, the electronic apparatus calculates the sliding track and the sliding angle, and displays a part of the menu operation interface with arc-shaped arrangement in the touch display screen, wherein the incomplete touch signal refers to that the touch sensing device continually detects the touch signal, the touch signal slides from the first display screen edge to the second display screen edge and the touch sensing device does not detect that the touch signal is terminated.

2. The electronic apparatus with the touch input system as claimed in claim 1, wherein when the sliding angle of the sliding track does not exceed the predetermined angle, the electronic apparatus calculates the sliding track and the sliding angle, and displays a part of the menu operation interface with arc-shaped arrangement in the touch display screen, and when the touch sensing device detects that the touch signal is terminated, the electronic apparatus executes one sector shaped functional option last displayed by the part of the menu operation interface with arc-shaped arrangement when the touch signal is terminated and a corresponding function instruction thereof, and closes the part of the menu operation interface with arc-shaped arrangement.

3. The electronic apparatus with the touch input system as claimed in claim 1, wherein the predetermined angle is 45 degrees.

4. The electronic apparatus with the touch input system as claimed in claim 1, wherein the touch sensing device presets a valid region and an invalid region used for detecting the touch signal in the touch display screen, and the touch signal slides clockwise or slides anticlockwise.

5. The electronic apparatus with the touch input system as claimed in claim 1, wherein when the touch sensing device detects another touch signal input from an opposite direction and detects that the touch signal is terminated, the menu operation interface with arc-shaped arrangement is closed.

6. The electronic apparatus with the touch input system as claimed in claim 1, wherein as the menu operation interface with arc-shaped arrangement is activated, when the touch sensing device detects a signal of another touch form outside the menu operation interface with arc-shaped arrangement, the menu operation interface with arc-shaped arrangement is closed.

7. The electronic apparatus with the touch input system as claimed in claim 1, wherein as the menu operation interface with arc-shaped arrangement is activated, when the touch sensing device detects a signal of another touch form in an invalid region, the menu operation interface with arc-shaped arrangement is closed.

* * * * *